United States Patent
Lopes (10) Patent No.: US 10,662,962 B2
(45) Date of Patent: May 26, 2020

(54) MULTI-STAGE IMPELLER PRODUCED VIA ADDITIVE MANUFACTURING

(71) Applicant: FLUID HANDLING LLC., Morton Grove, IL (US)

(72) Inventor: Jeffrey D. Lopes, Palatine, IL (US)

(73) Assignee: Fluid Handling LLC, Morton Grove, IL (US)

(*) Notice: Subject to any disclaimer, the term of this patent is extended or adjusted under 35 U.S.C. 154(b) by 196 days.

(21) Appl. No.: 15/715,710

(22) Filed: Sep. 26, 2017

(65) Prior Publication Data

US 2018/0128278 A1    May 10, 2018

Related U.S. Application Data

(60) Provisional application No. 62/399,661, filed on Sep. 26, 2016.

(51) Int. Cl.
*F04D 29/043* (2006.01)
*F04D 19/02* (2006.01)
(Continued)

(52) U.S. Cl.
CPC ............. *F04D 29/043* (2013.01); *F04D 1/06* (2013.01); *F04D 13/06* (2013.01); *F04D 17/12* (2013.01); *F04D 19/02* (2013.01); *F04D 25/0606* (2013.01); *F04D 29/023* (2013.01); *F04D 29/026* (2013.01); *F04D 29/053* (2013.01);
(Continued)

(58) Field of Classification Search
CPC ... F04D 1/06; F04D 3/00; F04D 17/12; F04D 19/02; F04D 29/181
See application file for complete search history.

(56) References Cited

U.S. PATENT DOCUMENTS

| 948,292 A | 2/1910 | Giesler |
|---|---|---|
| 1,822,945 A | 9/1931 | Weis |

(Continued)

FOREIGN PATENT DOCUMENTS

| GB | 952451 A | 3/1964 |
|---|---|---|
| WO | 2013017647 A1 | 2/2013 |

(Continued)

OTHER PUBLICATIONS

Quail, F.J., et al, "Development of a regenerative pump impeller using rapid manufacturing techniques," Rapid Prototyping Journal, 2010, 16 (5), pp. 337-344. http://www.emeraldinsight.com/doi/abs/10.1108/13552541011065731.

*Primary Examiner* — Kevin R Steckbauer
(74) *Attorney, Agent, or Firm* — Ware, Fressola, Maguire & Barber LLP (57) ABSTRACT

A pump features a two-part axial flow shaft having a static inner shaft portion and a rotating outer shaft portion; the static inner shaft portion having static diffuser vanes, and also having two shaft ends configured to affix to a frame of a pump so the static inner shaft portion does not rotate; and the rotating outer shaft portion having an outer portion configured to affix to a rotor of the pump to rotate the rotating outer shaft portion, also having rotating impeller vanes configured inside and coupled to the outer portion to move the fluid axially along the two-part axial flow shaft as the rotating outer shaft portion axially rotates in relation to the static inner shaft portion.

20 Claims, 9 Drawing Sheets

Fig. 4B (51) Int. Cl.
   *F04D 29/02*     (2006.01)
   *F04D 1/06*      (2006.01)
   *F04D 25/06*     (2006.01)
   *F04D 13/06*     (2006.01)
   *F04D 17/12*     (2006.01)
   *F04D 29/053*    (2006.01)
   *F04D 29/20*     (2006.01)
   *F04D 29/34*     (2006.01)
   *F04D 29/54*     (2006.01)
   *F04D 3/00*      (2006.01)
   *F04D 19/00*     (2006.01)

(52) U.S. Cl.
   CPC .............. *F04D 29/20* (2013.01); *F04D 29/34* (2013.01); *F04D 29/542* (2013.01); *F04D 29/548* (2013.01); *F04D 3/00* (2013.01); *F04D 19/002* (2013.01); *F05D 2230/30* (2013.01); *F05D 2230/31* (2013.01)

(56) References Cited

U.S. PATENT DOCUMENTS

| | | | |
|---|---|---|---|
| 1,912,452 A | 6/1933 | Hollander | |
| 2,500,400 A * | 3/1950 | Cogswell | F04D 3/02 415/91 |
| 2,706,451 A * | 4/1955 | Mayer-Ortiz | F04D 3/00 415/190 |
| 2,831,432 A | 4/1958 | Mann | |
| 3,017,837 A | 1/1962 | Judd | |
| 3,391,642 A | 7/1968 | Vymola | |
| 3,677,661 A * | 7/1972 | Pickens | F04D 3/00 415/199.5 |
| 4,278,399 A | 7/1981 | Erickson | |
| 5,209,650 A * | 5/1993 | Lemieux | F01D 15/10 384/115 |
| 7,326,034 B2 * | 2/2008 | Sheth | E21B 43/128 415/199.2 |
| 7,377,744 B2 | 5/2008 | Urban et al. | |
| 8,398,361 B2 | 3/2013 | Sagoo et al. | |
| 9,174,426 B1 | 11/2015 | Dowd | |
| 9,217,435 B2 * | 12/2015 | Moore | F04D 3/00 |
| 9,739,161 B2 * | 8/2017 | Gregory | F23C 7/004 |
| 9,874,213 B2 * | 1/2018 | Yazykov | F04D 13/10 |
| 2012/0134793 A1 | 5/2012 | Wu et al. | |
| 2012/0251308 A1 | 10/2012 | Mikkelsen et al. | |
| 2014/0241871 A1 * | 8/2014 | Gregory | F23R 3/14 415/208.1 |
| 2014/0252685 A1 | 9/2014 | Stucker et al. | |
| 2015/0017013 A1 | 1/2015 | Tozzi et al. | |
| 2015/0060042 A1 | 3/2015 | Shilpiekandula et al. | |
| 2015/0192130 A1 * | 7/2015 | Yazykov | F04D 13/10 417/423.3 |
| 2016/0158842 A1 | 6/2016 | Urbanski et al. | |
| 2016/0199914 A1 | 7/2016 | Potter | |
| 2016/0297006 A1 | 10/2016 | Buller et al. | |

FOREIGN PATENT DOCUMENTS

| | | |
|---|---|---|
| WO | 2014184368 A1 | 11/2014 |
| WO | 2016001368 A1 | 1/2016 |
| WO | 2016112169 A1 | 7/2016 |

* cited by examiner

Fig. 1A                                   Fig. 1B

Figure 1: Radial impeller pump (Prior art)

Figure 2: Electric motor rotor assembly used with a radial impeller pump (Prior art)

Figure 3: A radial impeller (Prior art)

Fig. 4A    Fig. 4B

Figure 4: Axial pressure pump

Fig. 5A                          Fig. 5B

Figure 5: Electric motor rotor assembly with the axial flow motor shaft

Figure 6: Axial flow pump motor shaft.

Figure 7: Comparison between resulting pump geometries of a radial impeller pump (Fig. 7A - Prior art) and a pump utilizing the present invention (Fig. 7B).

Figure 8: A propeller-like embodiment of the present invention.

Figure 9: A radial impeller embodiment of the present invention.

MULTI-STAGE IMPELLER PRODUCED VIA ADDITIVE MANUFACTURING

CROSS-REFERENCE TO RELATED APPLICATION

This application claims benefit to provisional patent application Ser. No. 62/399,661, filed 26 Sep. 2016, which is hereby incorporated by reference in its entirety.

BACKGROUND OF THE INVENTION

1. Field of the Invention

The present invention relates to an impeller for a pump; and more particularly relates to an impeller for an axial pump.

2. Brief Description of Related Art

As one skilled in the art would appreciate, the main parts of any pump are the driver, impeller, and casing. The driver provides the energy for pumping, the impeller imparts the kinetic energy from the driver into the fluid, and the casing guides the fluid to its intended path.

The driver is usually an electric motor or an engine which converts electric or chemical energy into rotational kinetic energy. By way of example, the driver will be described and illustrated as a brushed DC electric motor although it does not have to be for the invention to be useful. The motor is comprised of three main parts; a static element—the stator, a rotating element—the rotor, and a means to transmit energy—the shaft.

The motor works by running an electric current through coils of wire wrapped in a particular arrangement around the rotor. The current generates a magnetic field perpendicular to the magnetic axis fields in place due to permanent magnets which are affixed to the stator. The interaction of these fields creates a torque on the rotor which causes it to rotate. Running axially through the center of the rotor is the shaft onto which the pump's impeller is mounted.

There are three general categories of pump impellers; axial, semi-axial, and radial. In an axial impeller the radial velocity of the fluid is negligible and the pumping action occurs parallel to the axis of the motor shaft. In a semi-axial pump design the impeller has both radial and axial curvature and the radial component of the fluid velocity is no longer negligible. In a radial impeller the flow is almost entirely radial and the axial component of the fluid velocity is negligible.

FIGS. 1-3

Figure 1A:
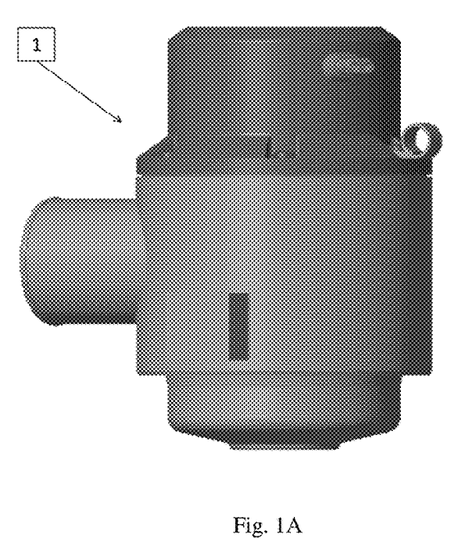
Figure 1B:
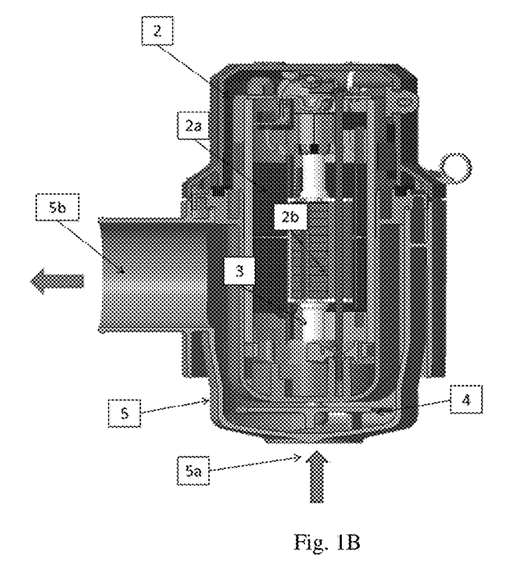
Figure 2A:
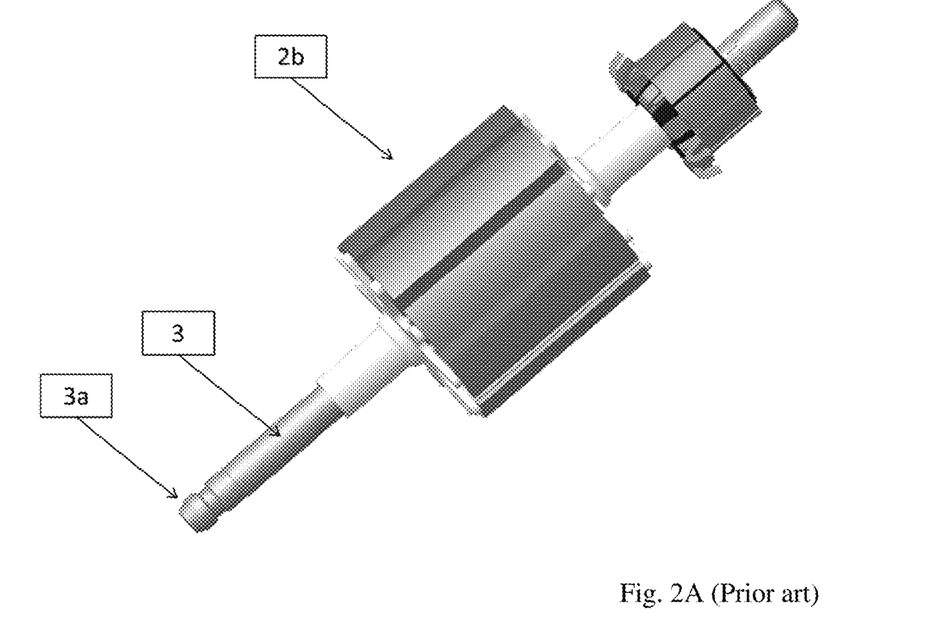
FIG. 2A shows the electric motor rotor assembly fully assembled; where
Figures 2B, 2C:
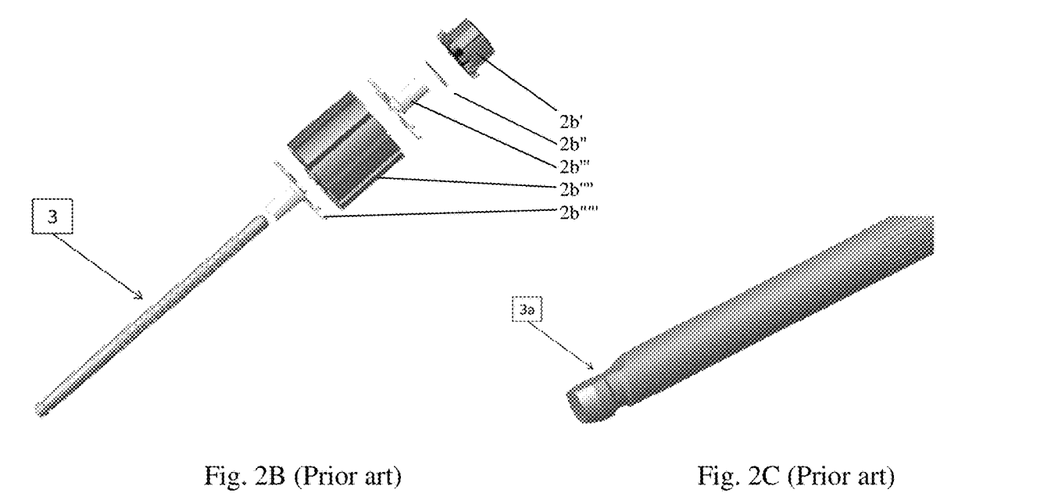
FIG. 2B shows an exploded view of the electric motor rotor assembly shown in FIG. 2A.
FIG. 2C shows a shaft end of the electric motor rotor assembly shown in FIGS. 2A and 2B for coupling to a radial impeller like that shown in FIGS. 1B and 3.

FIG. 1 shows both a cross section and an outer view of a typical centrifugal pump 1 that is known in the art. The pump consists of an electric motor 2, a shaft 3, a radial impeller 4 and a casing 5. The impeller is fixed to the shaft 3 and rotates due to magnetic forces generated in a combination of a stator 2a acting on a rotor 2b. FIG. 2 shows the rotor 2b of the electric motor 2 with the motor shaft running through its center and the feature onto which the impeller is mounted on end 3a. Fluid enters the pump parallel to the shaft's central axis through the inlet of the casing 5a, is accelerated by the rotating impeller in a direction perpendicular to the central axis of the shaft, and exits through the casing outlet 5b. The direction of fluid motion is indicated by the arrows in FIG. 1B. In this pump's impeller, the fluid enters axially and exits radially. This change in the direction of the fluid's velocity results in a decrease in the overall efficiency of the system but has historically been necessary in order to create a pump that can generate significant pressure with few components.

The reason for this can be demonstrated by examining Euler's pump and turbine equation which describes the theoretical maximum pressure increase through an impeller passage:

$$H = \frac{(c_{2u}U_2 - c_{1u}U_1)}{g},$$

where:
H=Pressure Generated,
$U_1$=Impeller peripheral velocity at the inlet of the vane,
$U_2$=Impeller peripheral velocity at the outlet of the vane,
$c_{1u}$=Fluid peripheral velocity at the inlet of the impeller vane,
$c_{2u}$=Fluid peripheral velocity at the outlet of the impeller vane, and
g=Gravitational acceleration.

Figure 3:
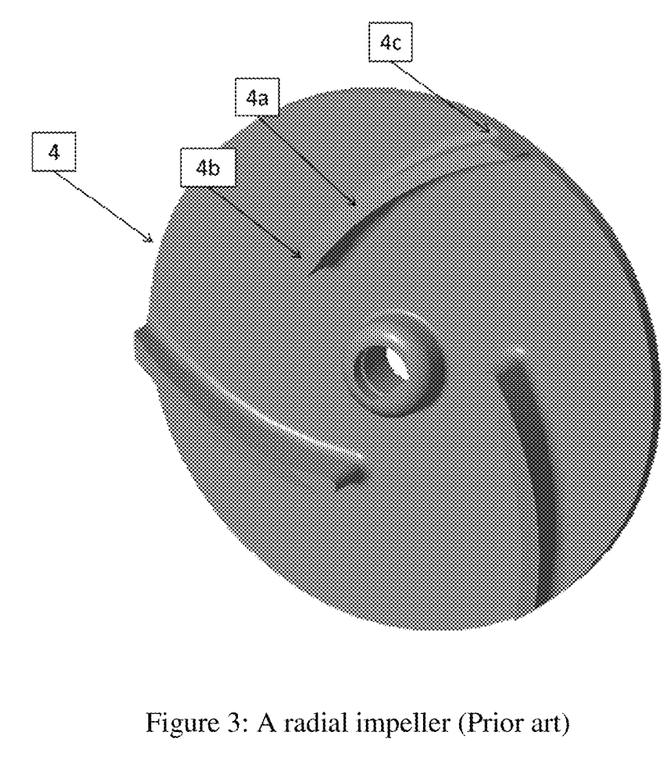
FIG. 3 shows a perspective view of a radial impeller having vanes that is known in the art.

For a radial impeller 4 like the one shown in FIG. 3 with vanes 4a that have a vane inlet 4b and a vane outlet 4c, the radius increases as the fluid passes through the impeller passageway. Both the impeller vane peripheral velocity and the fluid peripheral velocity increase linearly with the radius of the impeller resulting in the pressure increasing with the square of the impeller's radius. This results in large increases in pressure as the radius of the impeller is increased.

The alternative to using a radial impeller is to create a pump that has multiple axial impeller stages which are arranged in series. The total pressure created by the pump system is the sum of the pressure generated by each stage. This method has the benefits of reduced pump diameter and a theoretically higher pumping efficiency due to the relatively unidirectional velocity of the fluid throughout the pump. However each stage requires both a rotating and a stationary set of vanes resulting in a very complex design with many parts that is difficult to manufacture and assemble.

Shortcomings of Known Devices

Shortcomings of the known devices include the following:

An axial pump design has the advantage of high efficiency and is capable of high flow rates but is limited in its ability to generate pressure. In practice the pressure limitation is overcome by putting multiple axial impellers and diffusers in series, where the sum of the pressures generated by each impeller-diffuser combination determines the total pressure produced by the pump.

The limited pressure generation capabilities of axial flow impellers require several impeller-diffuser combinations be cascaded to achieve the pressure required for many pumping applications. This leads to a highly complex design with many parts that are difficult and expensive to manufacture.

The radial impeller has the highest pressure generation capability of the three impeller types but produces the least flow, and has a lower efficiency ceiling due to the changing of the direction of the flow through it. Radial impellers, along with semi-axial impellers, many times require a larger diameter than the motor which is used to drive them resulting in a bulky design. This can be overcome by cascading these impellers in series as is done with axial impellers but this is complex and expensive to construct and reduces the efficiency further due to the flow changing direction multiple times.

In view of the aforementioned, there is a need in the industry for a better pump and impeller design.

SUMMARY OF THE INVENTION

In summary, the present invention utilizes design freedoms allowed by additive manufacturing to create a multi-stage pump impeller that can also be integrated into the motor shaft to create an in-line fluid pump. By building the pumping mechanism into the shaft the resulting pump is smaller, has fewer parts, and has a higher efficiency ceiling in some embodiments.

Specific Embodiment

According to some embodiments, and by way of example, the present invention may include, or take the form of, a pump, featuring:

a two-part axial flow shaft having a static inner shaft portion and a rotating outer shaft portion;

the static inner shaft portion having static diffuser vanes, and also having two shaft ends configured to affix to a frame of a pump so the static inner shaft portion does not rotate; and the rotating outer shaft portion having an outer portion configured to affix to a rotor of the pump to rotate the rotating outer shaft portion, also having rotating impeller vanes configured inside and coupled to the outer portion to move the fluid axially along the two-part axial flow shaft as the rotating outer shaft portion axially rotates in relation to the static inner shaft portion.

According to some embodiments, the present invention may also include one or more of the following features:

The two-part axial flow shaft may be made by an additive manufacturing process, including where the additive manufacturing process is a powder bed fusion process.

The two-part axial flow shaft may include multiple stages, each stage having a a combination of a respective static diffuser vane and a respective rotating impeller vane, so that the respective static diffuser vane converts kinetic energy of the fluid exiting a rotating impeller vane outlet of the respective rotating impeller vane into pressure energy at a static diffuser vane outlet of the respective static diffuser vane, and so that the fluid exiting this stage enters a next stage where the process of moving the fluid, converting the kinetic energy into pressure energy, and feeding the fluid to the next stage is repeated.

The static inner shaft portion may include a shaft lock feature configured to couple to the frame portion of the pump to prevent the static inner portion from rotating.

The static inner shaft portion may include inlet guide vanes for guiding fluid flowing into the rotating outer portion.

The static inner shaft portion may include outlet guide vanes configured to guide fluid flowing out of the rotating outer portion and provide axial constraints between the static inner shaft portion and the rotating outer shaft portion.

The rotating outer shaft portion may include an inner hollow portion configured to receive on the static inner shaft portion and allow the rotating outer shaft portion to rotate in relation to the static inner shaft portion.

The two-part axial flow shaft may include alternating static diffuser vanes and rotating impeller vanes configured to move the fluid axially along the two-part axial flow shaft as the rotating outer shaft portion rotates.

The pump may include the frame, or the rotor, or both.

According to some embodiments, the present invention may include, or take the form of, a two-part axial flow shaft, featuring the static inner shaft portion having static diffuser vanes, and also having two shaft ends configured to affix to a frame of a pump so the static inner shaft portion does not rotate; and the rotating outer shaft portion having an outer portion configured to affix to a rotor of the pump to rotate the rotating outer shaft portion, also having rotating impeller vanes configured inside and coupled to the outer portion to move the fluid axially along the two-part axial flow shaft as the rotating outer shaft portion axially rotates in relation to the static inner shaft portion. Consistent with that discussed above, the two-part axial flow shaft may be made from an additive manufacturing process, including where the additive manufacturing process is a powder bed fusion process.

BRIEF DESCRIPTION OF THE DRAWING

The drawing, which is not necessarily drawn to scale, includes the following Figures:

FIG. 1 includes FIG. 1A which shows a side view of a radial impeller pump that is known in the art, and FIG. 1B which shows a cross-sectional view of the including the radial impeller pump shown in FIG. 1A.

FIG. 2 includes FIGS. 2A, 2B and 2C and shows an electric motor rotor assembly that is known in the art, e.g., used in a radial impeller pump like that shown in FIG. 1, where

FIG. 4 includes FIGS. 4A and 4B, where

FIG. 5 includes FIGS. 5A and 5B, where

FIG. 6 includes FIGS. 6A, 6B, 6C and 6D and shows an axial flow pump motor shaft, where

FIG. 7 includes FIGS. 7A and 7B, where

FIG. 8 includes FIGS. 8A, 8B and 8C and shows a propeller-like embodiment an axial flow pump motor shaft of the present invention, where

Similar parts in Figures are labeled with similar reference numerals and labels for consistency. Every lead line and associated reference label for every element is not included in every Figure of the drawing to reduce clutter in the drawing as a whole.

For the purpose of describing the present invention, the operation of the axial flow pump motor shaft of the present invention may be compared with a pump which uses a radial impeller that is known in the art.

DETAILED DESCRIPTION OF THE INVENTION

The present invention utilizes the design freedoms allowed by additive manufacturing to create a single part that contains many impeller-diffuser stages. The present invention allows high pressures to be generated in a pump without needing to change the direction of the fluid flow or increase the diameter of the pump or can be implemented in a radial embodiment to reduce the total number of parts in a multi-stage radial impeller pump.

Figure 4A:
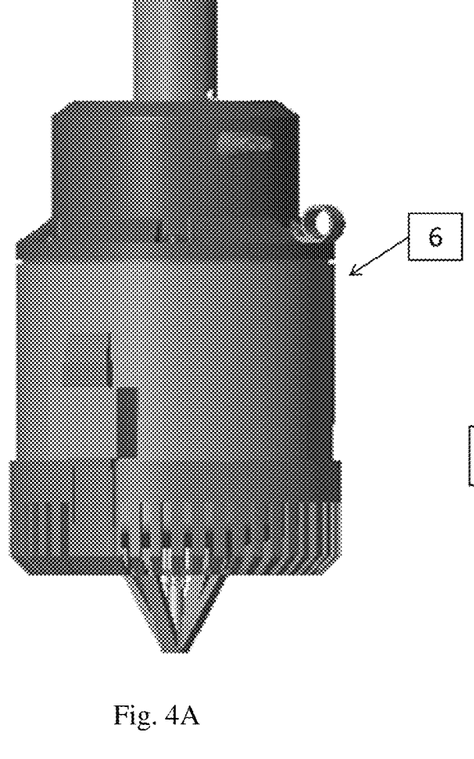
FIG. 4A shows an axial pressure pump.
Figure 4B:
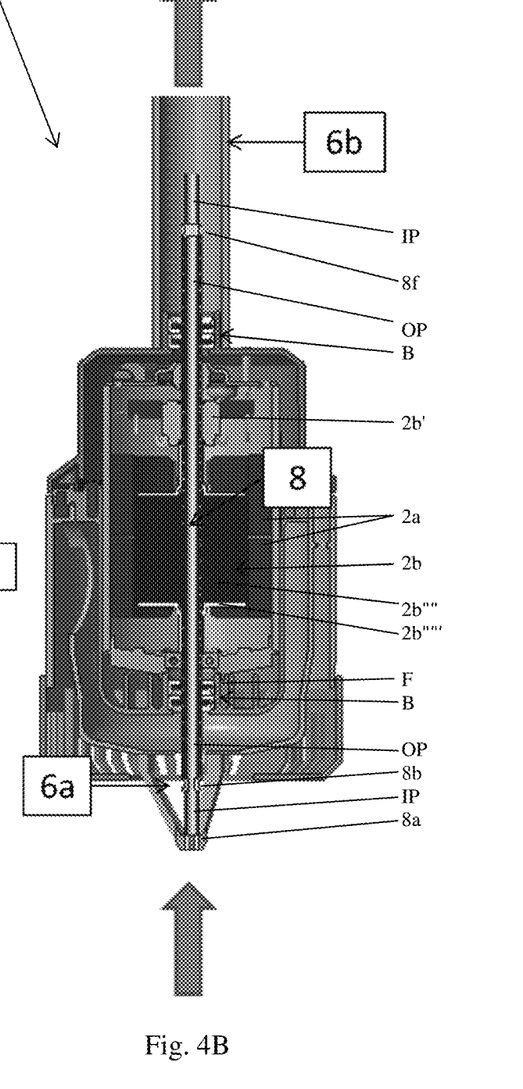
FIG. 4B shows a cross-section of the axial pressure pump in FIG. 4A, according to some embodiments of the present invention.

FIG. 4 shows an embodiment of a pumping system generally indicated as 6 which employs the technology according to the present invention, which will be called an axial pressure pump herein, e.g., having an axial flow shaft 8. In the axial pressure pump 6, and as shown in FIG. 4B, fluid enters axially through an axial pressure pump inlet 6a, flows axially through the center of the axial flow shaft 8, and exits axially through an axial pressure pump outlet 6b.

Figure 5A:
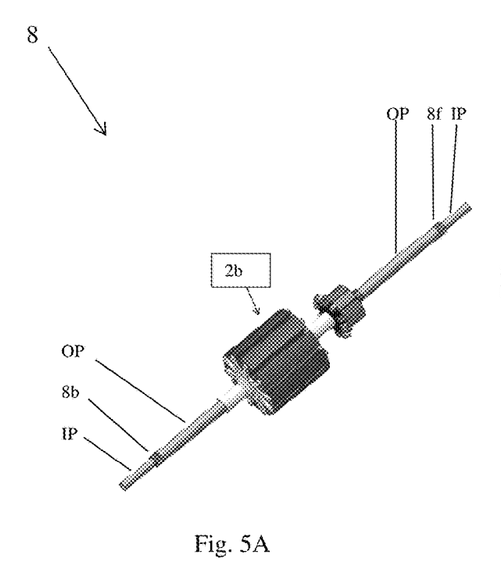
FIG. 5A shows an electric motor rotor assembly fully assembled.
Figure 5B:
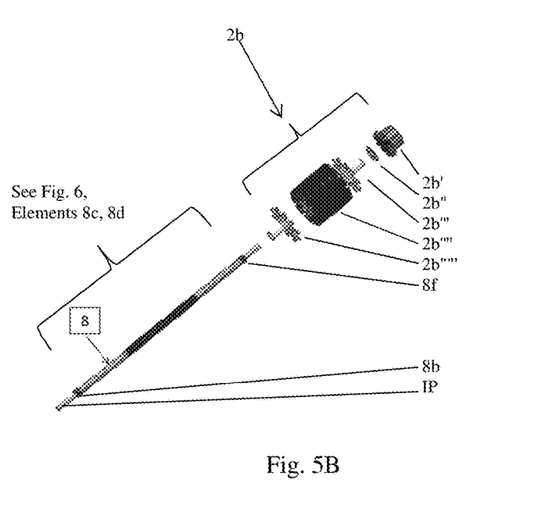
FIG. 5B shows an exploded view of the electric motor rotor assembly shows in FIG. 5A, both according to some embodiments of the present invention.

FIG. 5 shows the axial flow shaft 8 that is installed in place of the radial impeller motor shaft 4 (see and compare FIG. 1B). FIG. 6 shows features of the axial flow shaft 8 which allow the axial pressure pump 6 to operate entirely axially while at the same time generating significant pressure. The inner portion IP of the axial flow shaft 8 is static in operation and is prevented from rotating, e.g., by using a shaft lock feature 8a that is affixed axially by upper and lower bearings like element generally indicated as B (FIG. 4B) at each shaft end that are typical to motor shafts. The bearings B are arranged in, or coupled to, a frame F (FIG. 4B) of the pump 6. The outer portion OP of the axial flow shaft 8 is allowed to rotate in the same fashion as a typical motor shaft. At the inlet and outlet to the axial motor shaft 8, flow path are provided by a set of inlet guide vanes 8b (e.g., see FIGS. 6A, 6B, 6C) and outlet diffuser vanes 8f (e.g., see FIG. 6D). These diffuser vanes 8b, 8f serve the dual purpose of efficiently guiding the fluid into and out of the axial flow shaft 8 as well as providing axial constraints between the inner static portion IP and the outer rotating portion OP of the axial flow shaft 8.

Figure 6A:
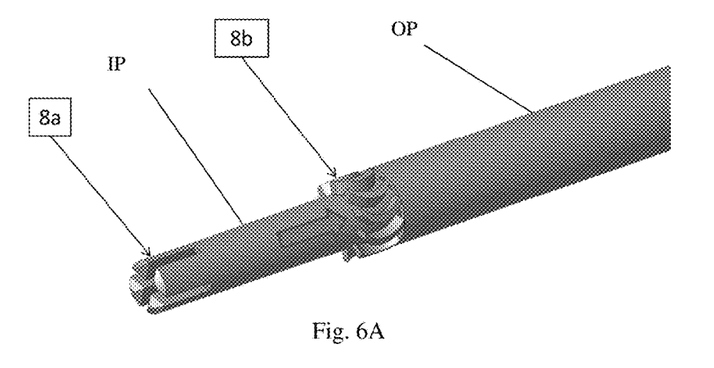
FIG. 6A is a perspective view of an inlet end of the axial flow pump motor shaft having a shaft lock, inlet guide vanes and one end of a rotating outer shaft part; where
Figure 6B:
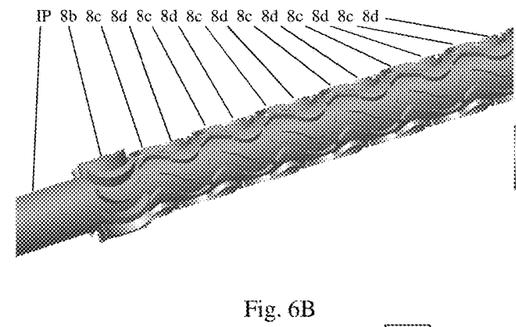
FIG. 6B is a perspective view of an intermediate part of the axial flow pump motor shaft having the inlet guide vanes shown in FIG. 6A and alternating rotator impeller vanes and stationary diffuser vanes configured or formed inside the rotating outer shaft part; where
Figure 6C:
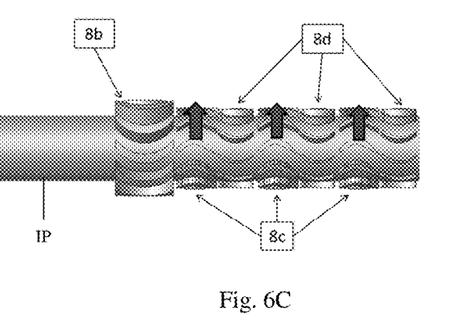
FIG. 6C is a side view of an intermediate part of the axial flow pump motor shaft having the inlet guide vanes shown in FIG. 6A and alternating rotator impeller vanes and stationary diffuser vanes configured or formed inside the rotating outer shaft part; and where
Figure 6D:
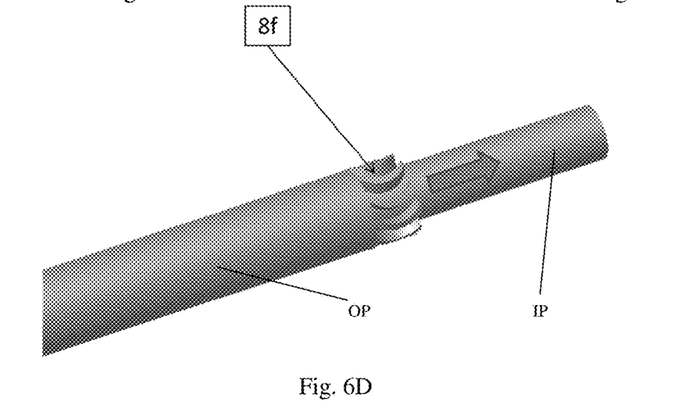
FIG. 6D is a perspective view of an outlet end of the axial flow pump motor shaft having outlet guide vanes and the other end of the rotating outer shaft part shown in FIG. 6A, all according to some embodiments of the present invention.

The rotating impeller vanes 8c are attached to the outer portion OP of the axial flow shaft 8 and rotate along with it. The arrows in the FIG. 6C indicate their direction of motion. The rotating impeller vanes 8c are configured and designed in such a way as to move the fluid at their inlet to their outlet from left to right in FIG. 6. The diffuser vanes 8d are attached to the inner, static portion IP of the axial flow shaft 8 and are configured and designed in such a way as to convert kinetic energy of the fluid exiting the outlet of the rotating impeller vanes 8c into pressure energy at the outlet of the diffuser vanes 8d. The fluid then exits this stage and enters a next stage, where the process of accelerating the fluid, converting the kinetic energy into pressure energy, and feeding higher pressure fluid to the next stage is repeated. FIG. 6 shows three stages of this action but many stages can be put in succession to create higher pressures, e.g., including three combinations of a rotating impeller vane 8c and a static diffuser vane 8d as shown in FIG. 6C. After the fluid has gone past all of the internal pump stages, it flows through the outlet diffuser vanes 8f and into the pump outlet 6b (FIG. 4B).

The concept of a multi-stage axial pump is not new and has been used extensively in the past. One point of novelty of the present invention is that all of the elements of the multi-stage pump are entirely contained within the axial motor shaft 8 and built together in one process utilizing additive manufacturing.

There are many potential advantages to employing this manufacturing method compared to a radial pump including the following:
  a pump with fewer parts;
  less required assembly;
  a thinner pump;
  a pump capable of self-priming;
  a pump that internally cools an electric motor allowing it to operate more efficiently or conversely uses the heat generated by the motor to increase the heat of the fluid;
  reduced motor torque requirements;
  a design that allows the use of plastic in place of metal for its motor shaft due to the reduced torsional strength requirements; and
  an ability to quickly prototype designs for scale testing of larger pumps using similitude methods.

Figure 7A:
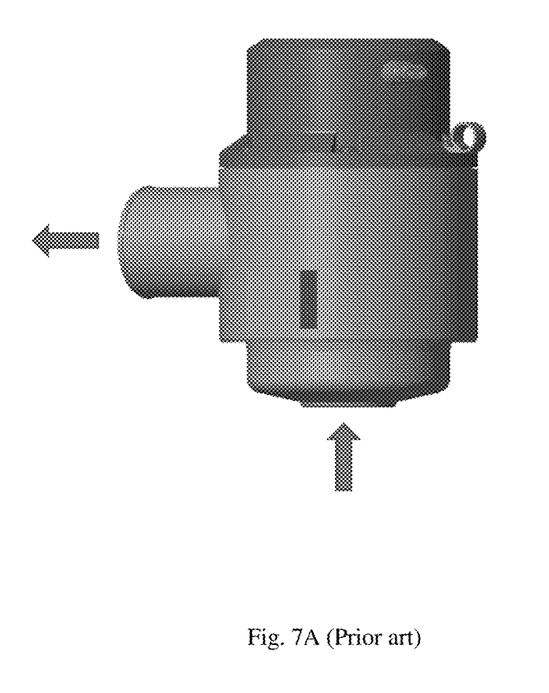
FIG. 7A shows a side view of the radial impeller pump that is known in the art and shown in FIG. 1, and where
Figure 7B:
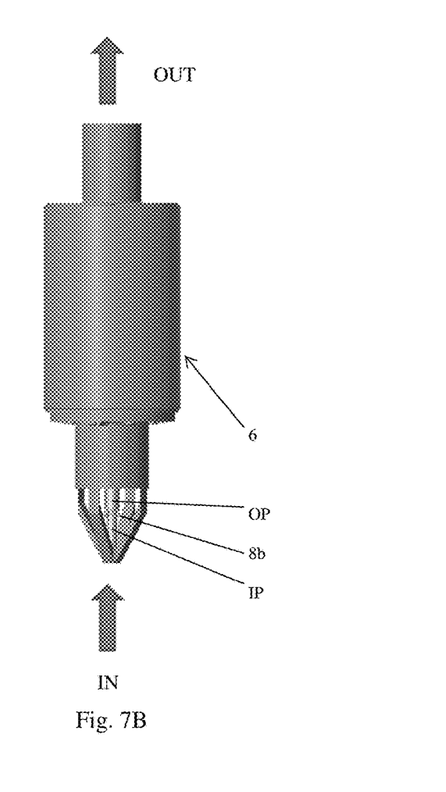
FIG. 7B shows a corresponding side view of an axial pump, according to some embodiments of the present invention.

By way of example, FIG. 7 shows a side-by-side comparison for comparing the geometry of a conventional pump (FIG. 7A) which includes a radial impeller, a pump casing, and a driver with the geometry of an axial flow motor shaft pump (FIG. 7B) that does not require a large casing and can be made thinner and in-line with a piping system.

Figures 8A, 8B, 8C:
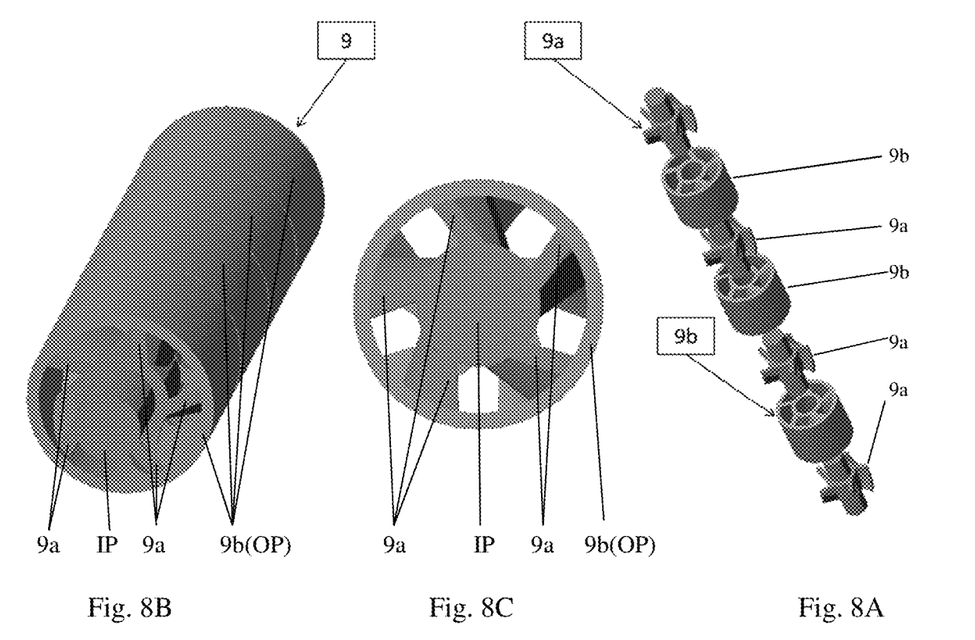
FIG. 8A shows an exploded perspective view of an axial flow pump motor shaft having alternating static and rotating elements; where
FIG. 8B shows an assembled perspective view of the axial flow pump motor shaft shown in FIG. 8A; and where
FIG. 8C shows an axial view along the axial flow pump motor shaft, all according to some embodiments of the present invention.
Figure 9:
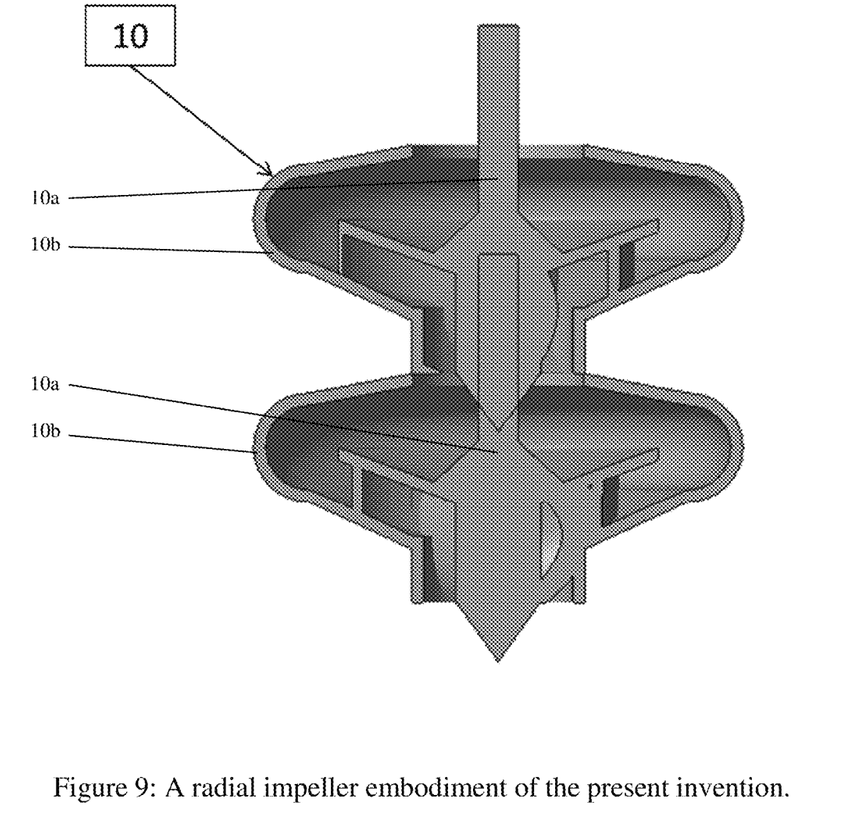
FIG. 9 shows a cross-sectional view of a radial impeller embodiment of the present invention.

FIGS. 8 and 9: Alternative Embodiments

By way of further example, FIGS. 8 and 9 s FIG. 8 how alternative embodiments of the present invention.

FIG. 8

For example, FIG. 8 shows an embodiment of the present invention having an axial flow pump shaft with a propeller-like shape generally indicated as 9 with one or more static elements 9a and one or more rotating elements 9b working in the same manner as previously described herein in relation to FIGS. 4-7 above. As shown in FIG. 8, each static elements 9a may be configured, formed, and/or dimensioned to fit inside a corresponding rotating element 9b, e.g., so as to form the axial motor shaft 9 having an outer cylindrical formation. The one or more static elements 9a are formed as part of the inner portion of the axial motor shaft 9, while the one or more rotating elements 9b form part of the outer portion of the axial motor shaft 9 for being rotated by the rotor assembly 2b (See FIG. 2, 4, 5).

In effect, the axial flow pump shaft 9 in FIG. 8 extends the present invention to additively manufactured multi-stage pumps with other impeller geometries which may be appropriate in, and suitably adapted for, different pumping applications.

FIG. 9

FIG. 9 shows a radial impeller embodiment generally indicated as 10 9 with one or more static elements 10a and one or more rotating elements 10b working in the same manner as previously described herein in relation to FIGS. 4-8 above. Conventional methods to prevent leakage of the internal fluid to the exterior of the pump would also be employed. For example, a lip or mechanical seal.

Powder Bed Fusion Implementation

Due to the complex nature of the geometry of the present invention, such a design could not be constructed with any other current process aside from additive manufacturing processes. Although not necessarily the only additive manufacturing process that could construct the present invention, the Powder Bed Fusion technique will be used to exemplify an additive method that could be used to construct the design.

By way of example, in the Powder Bed Fusion process, a part is built up layer by layer in a bed of powder using a laser whose path, intensity, speed, and several other parameters are determined by a computer program that uses a solid 3d model of the part to calculate their appropriate values. In the case of a metal shaft, the additive manufacturing construction of the design would begin on a build plate upon which the first layer or "slice" of the axial flow pump motor shaft would be formed. The forming of this slice would occur as a result of the melting and subsequent fusion of a thin layer of metal powder which had been laid atop the build plate onto the build plate as the laser is swept through the areas determined by the computer program to contain solid geometry in the first slice of the 3d model.

Upon completion of the first slice of the design, the build plate would be lowered, another layer of powder would be placed above the part and a second layer which corresponds to the second slice of the part would be formed in the same manner as the first slice only this time fusing to the previously built layer instead of the build plate. This process would continue until the entire solid geometry of the part was built.

Although some design constraints from the Powder Bed Fusion process exist and must be taken account for embodiments of the present invention, by using this process complex internal passageways can be built which would otherwise be extremely difficult or impossible to build using other metalworking processes. This part could also be made with plastic powder or with other additive processes including directed energy deposition or material jetting.

Applications

By way of example, possible applications of the present invention may include its use in relation to one or more of the following:

Applications in which a liquid or a gas needs to be pumped.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. An inline pump comprising:
   a motor having a two-part axial flow motor shaft with a static inner shaft portion and a rotating outer shaft portion and also having a stator configured to rotate a rotor arranged on the rotating outer shaft portion of the two-part axial flow motor shaft; and
   a multistage pump impeller integrated into the two-part axial flow motor shaft and formed by the static inner shaft portion and the rotating outer shaft portion;
      the static inner shaft portion having static diffuser vanes, and also having two shaft ends configured to affix to a frame of the inline pump so the static inner shaft portion does not rotate; and
      the rotating outer shaft portion having an outer portion configured to affix to the rotor of the motor of the inline pump to rotate the rotating outer shaft portion, also having rotating impeller vanes configured inside and coupled to the outer portion to move fluid axially along the two-part axial flow motor shaft as the rotating outer shaft portion axially rotates in relation to the static inner shaft portion.

2. An inline pump according to claim 1, wherein the two-part axial flow motor shaft is made from an additive manufacturing process.

3. An inline pump according to claim 2, wherein the additive manufacturing process is a powder bed fusion process.

4. An inline pump according to claim 1, wherein the two-part axial flow motor shaft has multiple stages, each stage having a combination of a respective static diffuser vane and a respective rotating impeller vane, so that the respective static diffuser vane converts kinetic energy of the fluid exiting a rotating impeller vane outlet of the respective rotating impeller vane into pressure energy at a static diffuser vane outlet of the respective static diffuser vane, and so that the fluid exiting a stage enters a next stage where the process of moving the fluid, converting the kinetic energy into pressure energy, and feeding the fluid to each subsequent stage is repeated.

5. An inline pump according to claim 1, wherein the inline pump comprises the frame having a shaft lock feature configured to couple to the static inner shaft portion and prevent the static inner portion from rotating.

6. An inline pump according to claim 1, wherein the static inner shaft portion comprises inlet guide vanes for guiding fluid flowing into the rotating outer shaft portion.

7. An inline pump according to claim 1, wherein the static inner shaft portion comprises outlet guide vanes configured to guide fluid flowing out of the rotating outer shaft portion and provide axial constraints between the static inner shaft portion and the rotating outer shaft portion.

8. An inline pump according to claim 1, wherein the rotating outer shaft portion has an inner hollow portion configured to receive the static inner shaft portion and allow the rotating outer shaft portion to rotate in relation to the static inner shaft portion.

9. An inline pump according to claim 1, wherein the two-part axial flow motor shaft has alternating static diffuser vanes and rotating impeller vanes configured to move the fluid axially along the two-part axial flow motor shaft as the rotating outer shaft portion rotates.

10. An inline pump according to claim 2, wherein the in-line fluid pump is an axial pressure pump.

11. An inline pump according to claim 1, wherein the inline is an axial pressure pump.

12. A multistage pump impeller for an inline pump having a motor arranged therein with a stator configured to rotate a rotor on a motor shaft, comprising:
   a two-part axial flow motor shaft having a combination of
      a static inner shaft portion and a rotating outer shaft portion that are integrated together to form the multistage pump impeller;
   the static inner shaft portion having static diffuser vanes, and also having two shaft ends configured to affix to a frame of the inline pump so the static inner shaft portion does not rotate; and
   the rotating outer shaft portion having an outer portion configured to affix to the rotor of the motor of the inline pump to rotate the rotating outer shaft portion, also having rotating impeller vanes configured inside and coupled to the outer portion to move fluid axially along the two-part axial flow motor shaft as the rotating outer shaft portion axially rotates in relation to the static inner shaft portion.

13. A multistage pump impeller according to claim 12, wherein the two-part axial flow motor shaft is made from an additive manufacturing process.

14. A multistage pump impeller according to claim 13, wherein the additive manufacturing process is a powder bed fusion process.

15. A multistage pump impeller according to claim 13, wherein the two-part axial flow motor shaft has alternating static diffuser vanes and rotating impeller vanes configured to move the fluid axially along the two-part axial flow motor shaft as the rotating outer shaft portion rotates.

16. A multistage pump impeller according to claim 12, wherein the two-part axial flow motor shaft has multiple stages, each stage having a combination of a respective static diffuser vane and a respective rotating impeller vane, so that the respective static diffuser vane converts kinetic energy of the fluid exiting a rotating impeller vane outlet of the respective rotating impeller vane into pressure energy at a static diffuser vane outlet of the respective static diffuser vane, and so that the fluid exiting a stage enters a next stage where the process of moving the fluid, converting the kinetic energy into pressure energy, and feeding the fluid to each subsequent stage is repeated.

17. A multistage pump impeller according to claim 12, wherein the static inner shaft portion comprises inlet guide vanes for guiding fluid flowing into the rotating outer shaft portion.

18. A multistage pump impeller according to claim 12, wherein the static inner shaft portion comprises outlet guide vanes configured to guide fluid flowing out of the rotating outer shaft portion and provide axial constraints between the static inner shaft portion and the rotating outer shaft portion.

19. A multistage pump impeller according to claim 12, wherein the rotating outer shaft portion has an inner hollow portion configured to receive the static inner shaft portion and allow the rotating outer shaft portion to rotate in relation to the static inner shaft portion.

20. A multistage pump impeller according to claim 12, wherein the two-part axial flow motor shaft has alternating static diffuser vanes and rotating impeller vanes configured to move the fluid axially along the two-part axial flow motor shaft as the rotating outer shaft portion rotates.

* * * * *